United States Patent
Watanabe et al.

(10) Patent No.: US 8,717,157 B2
(45) Date of Patent: May 6, 2014

(54) DISPLAY DEVICE FOR VEHICLE

(75) Inventors: Midori Watanabe, Niigata (JP); Masaki Katoh, Niigata (JP); Hikaru Hiraiwa, Niigata (JP); Ikuyo Sasajima, Niigata (JP); Yasuyuki Kojima, Niigata (JP); Takumi Sato, Niigata (JP)

(73) Assignee: Nippon Seiki Co., Ltd., Niigata (JP)

(*) Notice: Subject to any disclaimer, the term of this patent is extended or adjusted under 35 U.S.C. 154(b) by 141 days.

(21) Appl. No.: 12/999,538

(22) PCT Filed: Jun. 15, 2009

(86) PCT No.: PCT/JP2009/060834
§ 371 (c)(1),
(2), (4) Date: Mar. 25, 2011

(87) PCT Pub. No.: WO2009/157331
PCT Pub. Date: Dec. 30, 2009

(65) Prior Publication Data
US 2011/0163864 A1    Jul. 7, 2011

(30) Foreign Application Priority Data

Jun. 26, 2008  (JP) ................................. 2008-166718
Sep. 19, 2008  (JP) ................................. 2008-240329

(51) Int. Cl.
*B60Q 1/00*   (2006.01)

(52) U.S. Cl.
USPC ............. 340/441; 340/459; 340/438; 701/36; 701/429; 348/61; 348/113

(58) Field of Classification Search
USPC ............ 340/441, 459, 438, 439; 701/36, 429; 348/61, 113, 115, 118; 715/810, 768; 353/14, 12

See application file for complete search history.

(56) References Cited

U.S. PATENT DOCUMENTS

| | | | |
|---|---|---|---|
| 5,764,139 A * | 6/1998 | Nojima et al. | 340/461 |
| 6,721,634 B1 * | 4/2004 | Hauler et al. | 701/1 |
| 7,602,407 B2 * | 10/2009 | Gerlach et al. | 345/643 |
| 7,880,602 B2 * | 2/2011 | Kasamatsu | 340/461 |
| 7,966,123 B2 * | 6/2011 | Watanabe et al. | 701/429 |

(Continued)

FOREIGN PATENT DOCUMENTS

| | | |
|---|---|---|
| JP | 2004-136823 | 5/2004 |
| JP | 2004-157434 | 6/2004 |
| JP | 2008-030638 | 2/2008 |

*Primary Examiner* — Eric M Blount
(74) *Attorney, Agent, or Firm* — McDermott Will & Emery LLP (57) ABSTRACT

To provide a display device for vehicle in which, when particular vehicle information, for example vehicle information with great urgency and high priority is displayed, a passenger can easily recognize the information and his attention can be attracted to the information.

A display device for vehicle 1 includes an image display device 10 and control means 20 for displaying vehicle information as an image in the image display device 10, wherein, in transition from a first display form in which each of a first display image GR1 and a second display image GR2 is displayed to a second display form in which each of the first display image GR1, the second display image GR2, and a third display image GR3 is displayed, the control means 20 displays the third display image GR3 between the first and second display images after the first and second display images GR1 and GR2 are moved in a direction in which they are separated from each other or while they are moved in that direction.

3 Claims, 5 Drawing Sheets

(56) References Cited

U.S. PATENT DOCUMENTS

| | | |
|---|---|---|
| 8,063,919 B2 * | 11/2011 | Mizumaki et al. ............ 345/690 |
| 2004/0189546 A1 * | 9/2004 | Sumiyoshi ........................ 345/8 |
| 2005/0168330 A1 * | 8/2005 | Ono et al. ..................... 340/461 |
| 2006/0278155 A1 | 12/2006 | Soltendieck et al. |
| 2007/0078598 A1 | 4/2007 | Watanabe et al. |
| 2007/0171142 A1 * | 7/2007 | Ikarashi et al. .................. 345/4 |
| 2008/0161997 A1 | 7/2008 | Wengelnik et al. |
| 2011/0090074 A1 * | 4/2011 | Kuno et al. ................... 340/438 |

* cited by examiner

DISPLAY DEVICE FOR VEHICLE

RELATED APPLICATIONS

This application is the U.S. National Phase under 35 U.S.C. §371 of International Application No. PCT/JP2009/060834, filed on Jun. 15, 2009, which in turn claims the benefit of Japanese Application No. 2008-166718, filed on Jun. 26, 2008 and Japanese Application No. 2008-240329, filed on Sep. 19, 2008, the disclosures of which Applications are incorporated by reference herein.

TECHNICAL FIELD

The present invention relates to a display device for vehicle for displaying vehicle information.

BACKGROUND ART

A known display device for vehicle of this type is described in Patent Document 1, by way of example. The display device for vehicle includes, for example, an image display device formed of a liquid crystal panel, an EL panel, or any other flat display panel and control means including a microcomputer for displaying vehicle information as an image in the image display device. The image display device is provided for displaying, under control of the control means, a main meter image consisting of an analog speed meter image (vehicle information) and an analog tachometer image (vehicle information) at both ends on the left and right of its display screen, and displaying an auxiliary meter image consisting of an analog fuel meter image and an analog water-temperature meter image and an information display screen (vehicle information) consisting of geographic information, intervehicular distance information, and shift range information other than the meter image between the analog speed image and the analog tachometer image.

In the display device for vehicle for displaying the information display image other than the meter image between the main meter images in this manner, vehicle information with great urgency and high priority may be displayed in the information display image, for example imaging information from a night-vision camera, and alarm information including a remaining fuel amount and an intervehicular distance.

PRIOR ART DOCUMENT

Patent Document

Patent Document 1: JP-A-2004-157434

DISCLOSURE OF THE INVENTION

Problems that the Invention is to Solve

In the display device for vehicle described in the abovementioned publication, however, the main meter image and the information display image have the same sizes and positions at all times. When vehicle information with great urgency and high priority is displayed as the information display image, it may be impossible to allow a passenger to recognize this type of vehicle information easily and to attract his attention to the information, and there is room for improvement.

The present invention has been made in view of the abovementioned problem, and it is an object thereof to provide a display device for vehicle in which, when particular vehicle information, for example vehicle information with great urgency and high priority is displayed, a passenger can easily recognize the information and his attention can be attracted to the information.

To solve the abovementioned problem, the present invention is characterized by a display device for vehicle including an image display device and control means for displaying vehicle information as an image in the image display device, wherein the image includes a first display image serving as first vehicle information of the vehicle information, a second display image serving as second vehicle information different from the first vehicle information, and a third display image serving as third vehicle information different from the first and second vehicle information, and wherein the control means displays each of the first and second display images in a first display form in which the first and second display images are adjacent to each other, displays each of the first, second, and third display images in a second display form in which the first and second display images are adjacent to each other on both sides of the third display image, and in transition from the first display form to the second display form, displays the third display image between the first and second display images after the first and second display images are moved in a direction in which the first and second display images are separated from each other or while they are moved in that direction. Thus, when particular vehicle information is displayed, a passenger can easily recognize the information and his attention can be attracted to the information.

The present invention is also characterized in that the control means displays the third display image between the first and second display images such that a portion of the third display image and a portion of each of the first and second display images overlap each other and one of the display images is displayed at the front. Thus, when the particular vehicle information is displayed, a passenger can more easily recognize the information and his attention can be further attracted to the information.

The present invention is also characterized in that the control means displays the third display image and each of the first and second display images such that the overlapping portions are blurred. This can eliminate the borderline to smooth the display area, thereby reducing a feeling of awkwardness.

The present invention is also characterized in that one of the first and second vehicle information is speed information. Thus, the speed information required in running of the vehicle can be displayed.

The present invention is also characterized in that the control means displays the third display image between the first and second display images such that each of the first and second display images is scaled down. This can ensure a large display area for the third display image.

The present invention is also characterized in that each of the first and second display images has a decoration image portion which decorates the vehicle information, and that, in transition from the first display form to the second display form, the control means switches each of the first and second display images from a decoration display mode in which the decoration image portion is displayed to a simple display mode in which the decoration image portion is not displayed. Thus, since each of the first and second display images is simplified during the transition (transient period) from the first display form to the second display form, each of the moving first and second display images can be inconspicuous to reduce the demerits such as inconvenience and a feeling of awkwardness of the image movements and the tendency to watch the image more than necessary.

The present invention is also characterized in that each of the first and second display images has a background image portion which serves as a background of the vehicle information and a decoration image portion which decorates the vehicle information, and that, in transition from the first display form to the second display form, the control means changes a display state of at least one of the background image portion and the decoration image portion such that the display state before the transition is different from the display state after the transition. This can let a user to know (notify the user of) the change of the display form in the transition from the first display form to the second display form, thereby reducing confusion caused by a sudden change of the display form.

Advantage of the Invention

According to the present invention, the above-mentioned object can be attained, and when particular vehicle information is displayed, a passenger can easily recognize the information and his attention can be attracted to the information.

BEST MODE FOR CARRYING OUT THE INVENTION

Embodiments of the present invention will hereinafter be described with reference to the drawings.

Figure 1:
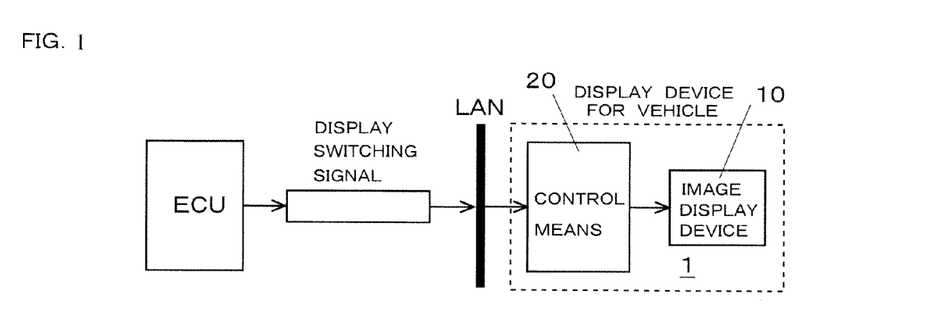
FIG. 1 A block diagram showing the system overviews of a display device for vehicle according to a first embodiment of the present invention.
Figure 2:
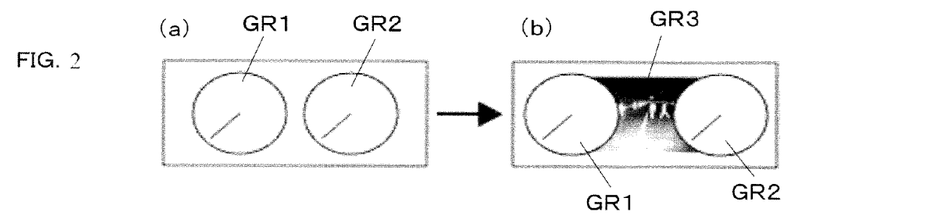
FIGS. 2(a) and 2(b) are front views showing display images and their changes in the first embodiment of the present invention.

FIG. 1 and FIG. 2 show a first embodiment of a display device for vehicle according to the present invention, wherein FIG. 1 is a block diagram showing the system overviews of the display device for vehicle according to the present embodiment and FIGS. 2(a) and 2(b) are front views showing display images and their changes.

In FIG. 1, a display device for vehicle 1 according to the present embodiment includes an image display device 10 and control means 20 for displaying vehicle information as an image on the image display device 10, and is connected to a vehicle-side ECU (Engine Control Unit) through an in-vehicle LAN (Local Area Network), for example.

The image display device is formed of a TFT (thin film transistor) liquid crystal panel, for example. An arbitrary display panel such as an EL panel can be used if vehicle information can be displayed as an image under control of the control means 20.

The control means 20 includes elements, including a microcomputer, a graphic controller, and a storage apparatus such as ROM, RAM, and flash memory, necessary for controlling the drive of the image display device 10 in response to a display switching signal input from the vehicle-side ECU through the in-vehicle LAN and various types of vehicle information.

As shown in FIG. 2(a), in a display screen of the image display device 10, a first display image GR1 which displays a vehicle speed (first vehicle information) in analog form is displayed on the left side and a second display image GR2 which displays vehicle engine revolutions (second vehicle information) in analog form is displayed on the right side such that the images GR1 and GR2 are adjacent to each other with an interval between them (a first display form) during normal running, for example.

Each of the display images GR1 and GR2 is displayed as a moving image by reading and reproducing image data formed of a plurality of patterns stored in the storage apparatus of the control means 20 in response to a change amount of vehicle information.

For example, when a night-vision camera, not shown, mounted on a vehicle body captures life, the display switching signal from the vehicle-side ECU through the in-vehicle LAN and a taken image signal from the night-vision camera are input. When such an alarm or a notice is issued, a third display image GR3 formed of the taken image of the night-vision camera is displayed as third vehicle information between the adjacent first and second display images (a second display form) as shown in FIG. 2(b).

For transition from the first display form shown in FIG. 2(a) to the second display form shown in FIG. 2(b), after the first and second display images GR1 and GR2 are moved in directions in which they are separated (moved away) from each other, or while they are moved in those directions, the third display image GR3 is displayed between the first and second display images GR1 and GR2.

As described above, in the present embodiment, in the display device for vehicle 1 including the image display device 10 and the control means 20 for displaying the vehicle information as the image in the image display device 10, the image includes the first display image GR1 serving as the first vehicle information of the vehicle information, the second display image GR2 serving as the second vehicle information different from the first vehicle information GR1, and the third display image GR3 serving as the third vehicle information different from the first and second vehicle information, and the control means 20 displays each of the first and second display images GR1 and GR2 in the first display form in which the first and second display images GR1 and GR2 are adjacent to each other, displays each of the first, second, and third display images GR1 to GR3 in the second display form in which the first and second display images GR1 and GR2 are adjacent to each other on both sides of the third display image GR3, and in the transition from the first display form to the second display form, displays the third display image GR3 between the first and second display images GR1 and GR2 after the first and second display images GR1 and GR2 are moved in a direction in which the first and second display images are separated from each other or while they are moved in that direction. Thus, the particular vehicle information, the third display image GR3 which is the taken image of the night-vision camera in the present embodiment, can be displayed in the intermediate portion which is the display space enlarged by the movements of the first and second display images GR1 and GR2 between the first and second display images GR1 and GR2, so that a passenger can recognize the image more easily and attract more attention to the image. In addition, since the speed information is displayed as the first display image, the speed information required in running of the vehicle can be displayed.

As the particular vehicle information, arbitrary vehicle information can be used basically. However, information with great urgency or high priority is preferable such as various types of alarm information including a seat belt alarm, a low fuel alarm, and an intervehicular distance alarm.

Figure 3:
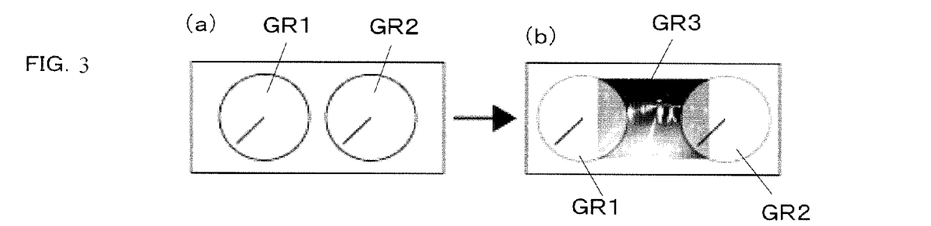
FIGS. 3(a) and 3(b) are front views showing display images and their changes in a second embodiment of the present invention.

FIGS. 3(a) and 3(b) are front views showing display images and their changes in a second embodiment of the present invention. In the present embodiment, control means 20 displays a third display image GR3 between a first display image GR1 and a second display image GR2 such that a portion of the third display image GR3 is located at the front and portions of the first and second display images GR1 and GR2 are located at the back and the images GR1 to GR3 overlap each other to allow both of the display image GR3 and the display images GR1 and GR2 to be visually recognized.

Such a configuration enables effective use of display space. In displaying the display images GR1 to GR3 overlapping each other, the overlapping portions may be blurred. This configuration can eliminate the borderline between the display images GR1 to GR3 to smooth the display area, thereby reducing a feeling of awkwardness.

Figure 4:
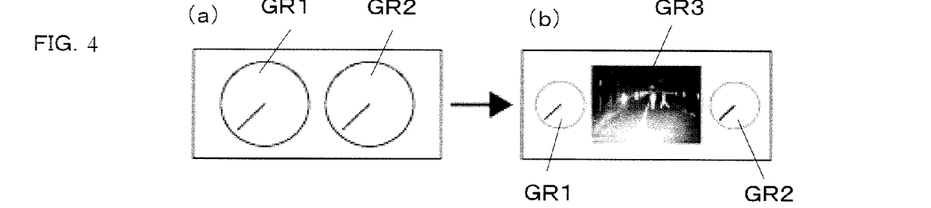
FIGS. 4(a) and 4(b) are front views showing display images and their changes in a third embodiment of the present invention.

FIGS. 4(a) and 4(b) are front views showing display images and their changes in a third embodiment of the present invention. In the present embodiment, when a third display image GR3 is displayed between a first display image GR1 and a second display image GR2, each of the first and second display images GR1 and GR2 is scaled down. This can ensure a large display area for the third display image GR to allow a passenger to recognize the image more easily and to attract more attention to the image.

Figure 5:
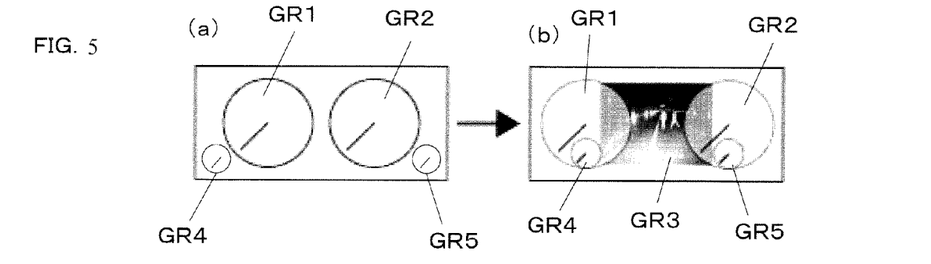
FIGS. 5(a) and 5(b) are front views showing display images and their changes in a fifth embodiment of the present invention.

FIGS. 5(a) and 5(b) are front views showing display images and their changes in a fourth embodiment of the present invention. In the present embodiment, in addition to the first and second display images GR1 and GR2 formed of the vehicle speed and the engine revolutions, respectively, a fourth display image GR4 and a fifth display image GR5 formed of fuel (fourth vehicle information) and water temperature of engine cooling water (fifth vehicle information), respectively, are displayed on both sides of the images GR1 and GR2 in a first display form shown in FIG. 2(a). In a second display form shown in FIG. 5(b), the display images GR4 and 5 are displayed at positions inside the display images GR1 and GR2, respectively, that do not interfere with the readability of the display images GR1 and GR2 and do not overlie the display image GR3. This allows the fourth and fifth display images GR4 and GR5 serving as auxiliary meter information to be displayed simultaneously with the first and second display images 1 and 2 while a wide display region is ensured for the display image GR3, so that the display space can be effectively used.

Figure 6:
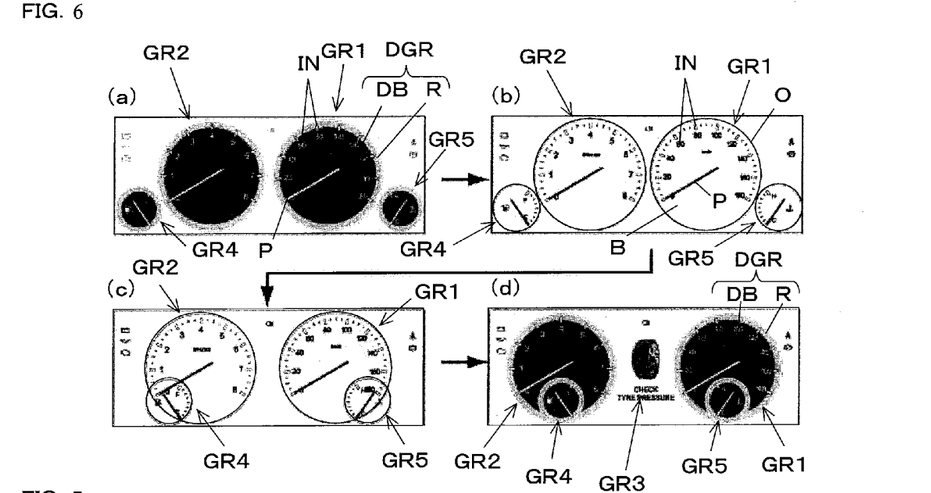
FIGS. 6(a) to 6(d) are front views showing display images and their changes in the sixth embodiment of the present invention.

FIGS. 6(a) to 6(d) are front views showing display images and their changes in a fifth embodiment of the present invention. In the present embodiment, FIG. 6(a) shows a first display form, FIG. 6(d) shows a second display form, and FIGS. 6(b) and 6(c) show intermediate stages from the first display form in FIG. 6(a) to the second display form in FIG. 6(d).

In the first display form shown in FIG. 6(a), a fourth display image GR4 and a fifth display image GR5 are displayed with an appropriate interval on both sides of a first display image GR1 and a second display image GR2, respectively. This is the same as in the fourth embodiment described above. However, each of the first and second display images GR1 and GR2 and the fourth and fifth display images GR4 and GR5 has not only vehicle information (image) formed of a pointer P and an indicator portion IN consisting of numbers and markings but also a decoration image portion DGR for decorating the vehicle information. Control means 20 displays each of the display images GR1, GR2, GR4, and GR5 in a decoration display mode including the decoration image portion DGR in the first display form. In this case, the decoration image portion DGR is formed of a decoration ring R which fringes the periphery of the vehicle information and a decoration background DB which serves as the background of the vehicle information. The decoration ring R is displayed, for example, as a graphic image having a silver-color metallic feel. The decoration background DB is formed of a graphic image with arrangement of two colors including black in a central portion and dark gray in a peripheral portion such that the central portion is given a sense of greater depth. The decoration background DB may be formed by using appropriate arrangement of colors such that a metallic feel is provided or by using gradation of colors gradually changed in a particular direction. In addition, an arbitrary decoration image portion DGR may be used as long as the vehicle information is decorated.

The first display form shown in FIG. 6(d) is the same as the fourth embodiment described above in that the display images GR4 and 5 are displayed at the positions inside the display images GR1 and GR2, respectively, that do not interfere with readability of the display images GR1 and GR2 and do not overlie the display image GR3. The details of the display images GR1, GR2, GR4, and GR5 are the same as those in the first display form shown in FIG. 6(a), and each is displayed in the decoration display mode having the decoration image portion DGR. In this case, a third display image GR3 is formed of an image representing an alarm about the air pressure of a tire, and is displayed when an alarm condition (for example, when the air pressure falls below a predetermined value) is satisfied on the basis of a signal from a tire air pressure sensor, not shown, under control of the control means 20.

The transition from the first display form (FIG. 6(a)) to the second display form (FIG. 6(d)) is performed through FIG. 6(b) and FIG. 6(c) subsequent thereto.

Specifically, when the control means 20 determines that the alarm condition about the tire air pressure is satisfied during the first display form (the decoration display mode) in FIG. 6(a), the control means 20 first switches the display images GR1, GR2, GR4, and GR5 from the decoration display mode in FIG. 6(a) to a simple display mode in FIG. 6(b). In this case, in the simple display mode, the decoration image portion DGR is not displayed, and a display screen is composed of line drawings formed of a pointer P, an indicator portion IN, and an outline O for defining the regions of the display images GR1, GR2, GR4, and GR5, which are the minimum required for indicating the vehicle information, and a background B of the single color which is the same as the background color outside the outline O. Then, as shown in FIG.

6(c), the movements of the first and second display images GR1 and GR2 in separating directions and the movements of the fourth and fifth display images GR4 and GR5 toward the center are started. When the movements are finished, the display images GR1, GR2, GR4, and GR5 are switched from the simple display mode to the decoration display mode, and the third display information GR3 is displayed in the central space unoccupied after the movements of the display images GR1, GR2, GR4, and GR5 as shown in FIG. 6(d).

In the simple display mode in FIGS. 6(b) and 6(c), the outline O may be eliminated. Similarly, the background B may have a color different from the background color outside the outline O. In addition, the fourth and fifth display images GR4 and GR5 may be eliminated.

As described above, in the present embodiment, each of the first, second, fourth, and fifth display images GR1, GR2, GR4, and GR5 has the decoration image portion DGR which decorates the vehicle information, and in the transition from the first display form to the second display form, the control means 20 switches each of the first, second, fourth, and fifth display images GR1, GR2, GR4, and GR5 from the decoration display mode in which the decoration image portion DGR is displayed to the simple display mode in which the decoration image portion DGR is not displayed. Thus, since each of the first, second, fourth, and fifth display images GR1, GR2, GR4, and GR5 is simplified during the transition (transient period) from the first display form to the second display form, each of the moving first, second, fourth, and fifth display images GR1, GR2, GR4, and GR5 can be inconspicuous to reduce the demerits such as inconvenience and a feeling of awkwardness of the image movements and the tendency to watch the image more than necessary.

Figure 7:
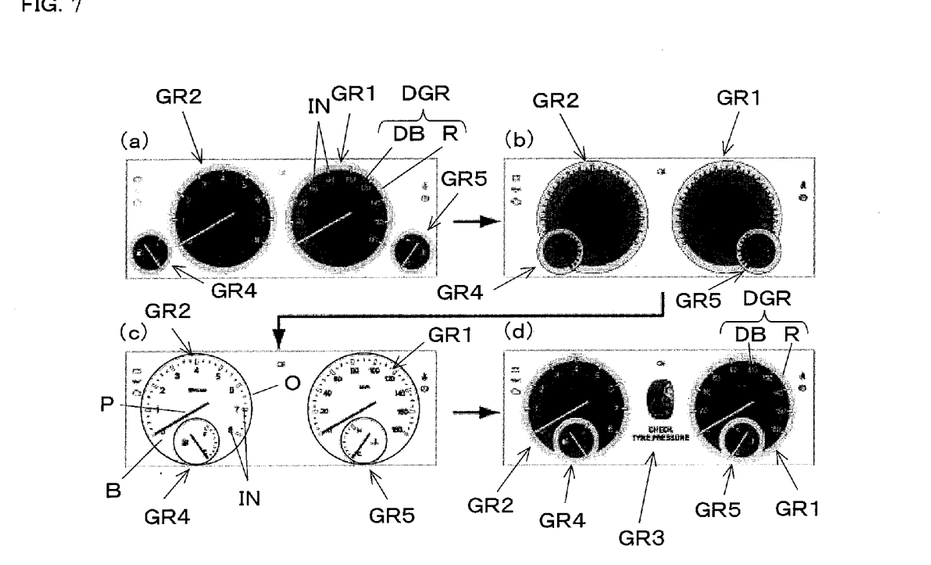
FIGS. 7(a) to 7(d) are front views showing display images and their changes in the seventh embodiment of the present invention.

FIGS. 7(a) to 7(d) are front views showing display images and their changes in a sixth embodiment of the present invention. In the present embodiment, FIG. 7(a) shows a first display form, FIG. 7(d) shows a second display form, and FIGS. 7(b) and 7(c) show intermediate stages from the first display form in FIG. 7(a) to the second display form in FIG. 7(d). While the present embodiment is the same as the fifth embodiment described above in that the first display form in FIG. 7(a) and the second display form in FIG. 7(d) are displayed in a decoration display mode, the present embodiment differs from the fifth embodiment in the intermediate stages from the first display form to the second display form.

Specifically, in the present embodiment, as shown in FIG. 7(b), the movements of first, second, fourth, and fifth display images GR1, GR2, GR4, and GR5 are started while the decoration display mode is maintained, and the decoration display mode is switched to a simple display mode during the movements, and the simple display mode is maintained until the movements are finished as shown in FIG. 7(c). The simple display mode is the same as that in the fifth embodiment described above. Then, as shown in FIG. 7(d), the simple display mode is switched to the decoration display mode.

The present embodiment configured as above can be expected to provide the same effects as those in the fifth embodiment described above.

Figure 8:
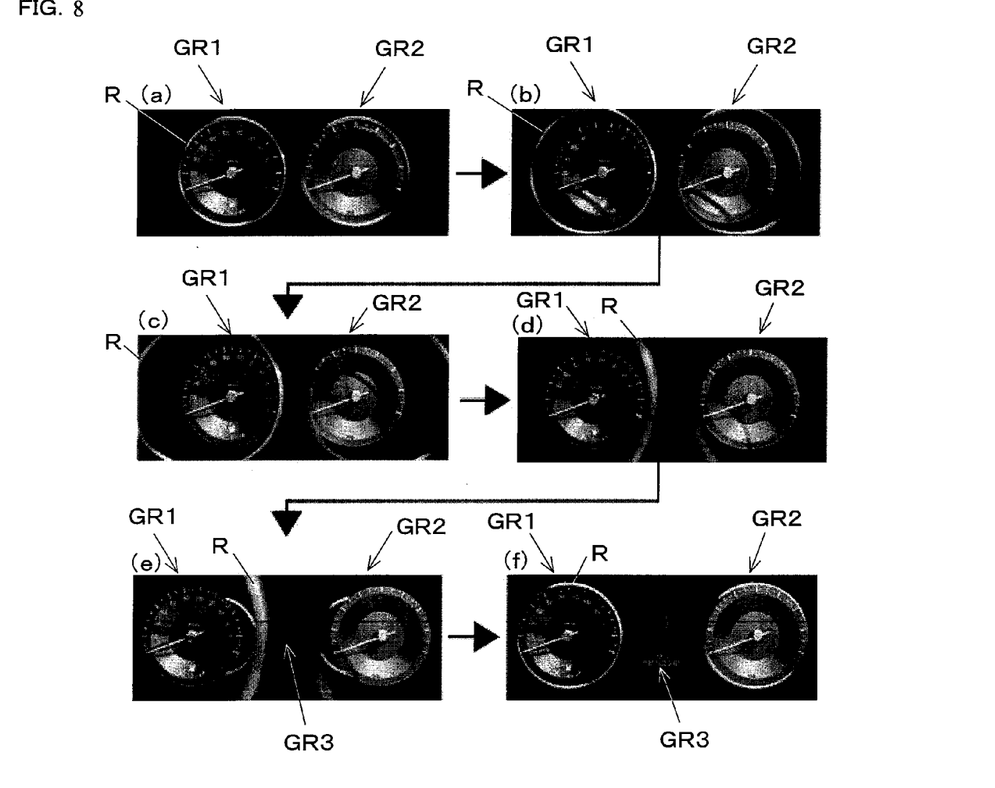
FIGS. 8(a) to 8(f) are front views showing display images and their changes in the eighth embodiment of the present invention.

FIGS. 8(a) to 8(f) are front views showing display images and their changes in a seventh embodiment of the present invention. In the present embodiment, FIG. 8(a) shows a first display form, FIG. 8(f) shows a second display form, and FIGS. 8(b) and 8(e) show intermediate stages from the first display form in FIG. 8(a) to the second display form in FIG. 8(f).

In the present embodiment, each of display images GR1 and Gr2 has a metallic (silver color) decoration ring (decoration image portion) R, for example. In the first display mode in FIG. 8(a), the decoration ring R is a normal fixed ring which surrounds the periphery of each of the display images GR1 and GR2. When an alarm condition about a tire air pressure is satisfied, for example, control means 20 performs processing to enlarge the display of the decoration ring R gradually in association with the movements of the display images GR1 and GR2 to separating directions as shown in FIGS. 8(b) to 8(e), and in association with the completion of the movements of the display images GR1 and GR2, returns the decoration ring R to the normal position surrounding the periphery of each of the display images GR1 and GR2 and displays a third display image GR3 within the space formed by the movements of the display images GR1 and GR2.

As described above, in the present embodiment, each of the first and second display images GR1 and GR2 has the decoration ring R which decorates the vehicle information, and in transition from the first display form to the second display form, the control means 20 gradually enlarges the display state of the decoration ring R such that the display before the transition is different from that after the transition. This can let a user to know (notify the user of) the change of the display form to reduce confusion caused by a sudden change of the display form.

While the present embodiment has shown the example in which the display state of the decoration ring R is changed as the image portion not involved in the display of the vehicle information, it is possible to change any other display state such as the color, the pattern, brightness or the like of a background image portion of each of the first and second display images GR1 and GR2 and a background image portion of the outer periphery of each of the first and second display images GR1 and GR2.

Figure 9:
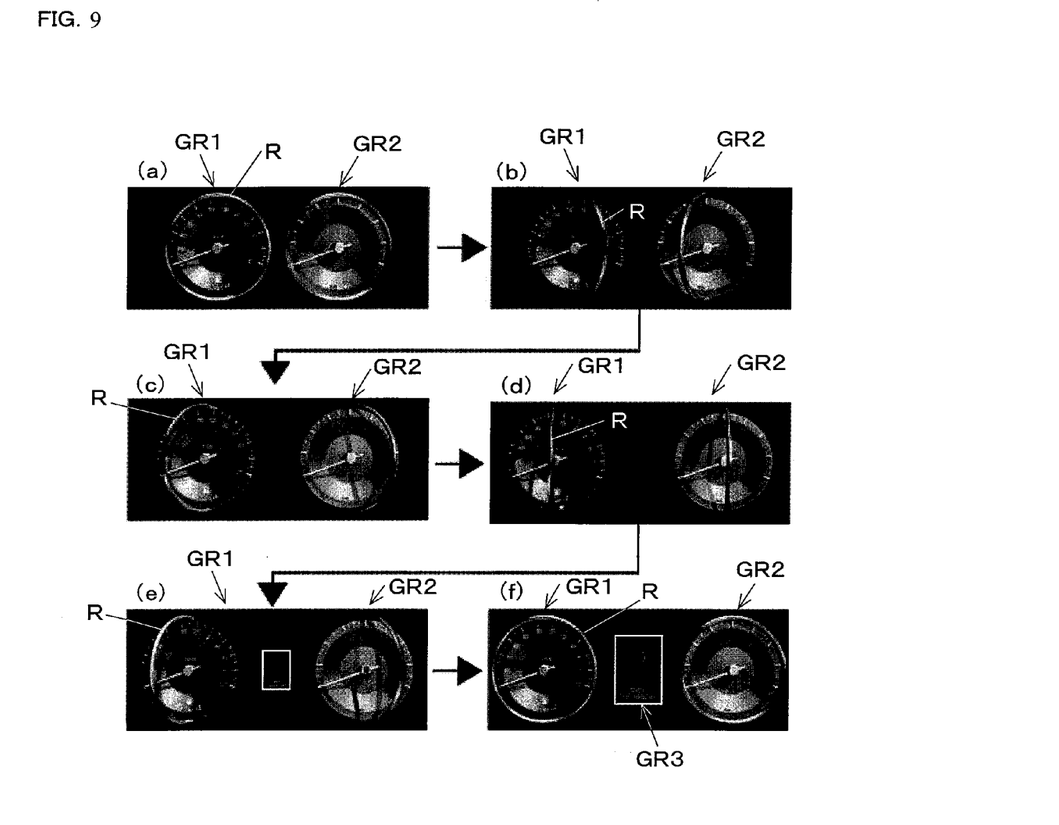
FIGS. 9(a) to 9(f) are front views showing display images and their changes in the ninth embodiment of the present invention.

FIGS. 9(a) to 9(f) are front views showing display images and their changes in a eighth embodiment of the present invention. In the present embodiment, FIG. 9(a) shows a first display form, FIG. 9(f) shows a second display form, and FIGS. 9(b) and 9(e) show intermediate stages from the first display form in FIG. 9(a) to the second display form in FIG. 9(f).

In the present embodiment, the display state is changed such that a decoration ring R is rotated in the intermediate stages shown in FIGS. 9(b) to 9(e).

The present embodiment configured as above can be expected to provide the same effects as those in the seventh embodiment described above.

Figure 10:
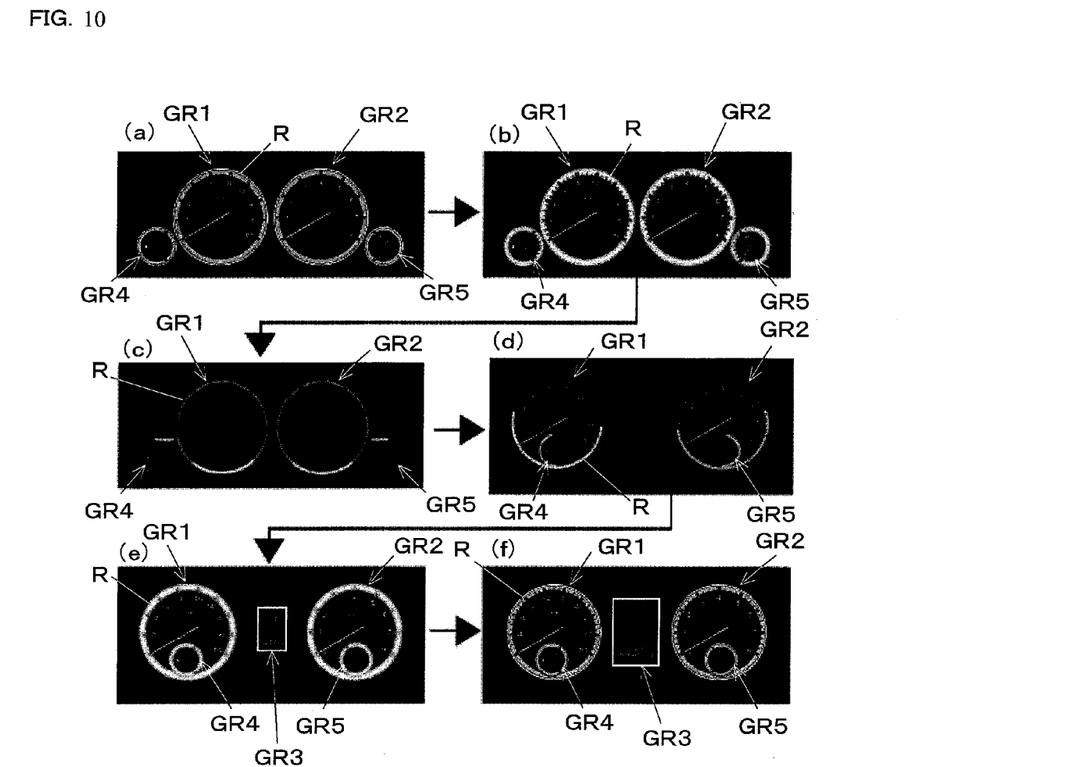
FIGS. 10(a) to 10(f) are front views showing display images and their changes in the fourth embodiment of the present invention.

FIGS. 10(a) to 10(f) are front views showing display images and their changes in a ninth embodiment of the present invention. In the present embodiment, FIG. 10(a) shows a first display form, FIG. 10(f) shows a second display form, and FIGS. 10(b) and 10(e) show intermediate stages from the first display form in FIG. 10(a) to the second display form in FIG. 10(f).

In the present embodiment, the display state is changed such that the color tone and the feel of a decoration ring R in the intermediate stages in FIGS. 10(b) to 10(e) are different from those in FIGS. 10(a) and 10(f).

Specifically, while the decoration ring R is a silver-color metallic ring in FIGS. 10(a) and 10(f), the ring R has a predetermined color (for example, yellow) in FIGS. 10(b) to (e). In addition, a region of the ring R having high brightness is moved in a circumferential direction in the stages from FIGS. 10(c) to 10(d).

The present embodiment configured as above can be expected to provide the same effects as those in the eighth embodiment described above.

INDUSTRIAL APPLICABILITY

The present invention is applicable to a display device for vehicle in automobiles, motorcycles, machines for agriculture, machines for construction and the like.

DESCRIPTION OF REFERENCE NUMERALS AND SIGNS 1 display device for vehicle
10 image display device
20 control means
B background
DB decoration background
DGR decoration image portion
GR1 first display image
GR2 second display image
GR3 third display image
GR4 fourth display image
GR5 fifth display image
In indicator portion
O outline
P pointer
R decoration ring
FIG. 1
VEHICLE-SIDE ECU
DISPLAY SWITCHING SIGNAL
IN-VEHICLE LAN
METER
20 CONTROL MEANS
10 DISPLAY DEVICE

The invention claimed is:

1. A display device for vehicle comprising an image display device and control means for displaying vehicle information as an image in the image display device,
wherein the image includes a first display image serving as first vehicle information of the vehicle information, a second display image serving as second vehicle information different from the first vehicle information, and a third display image serving as third vehicle information different from the first and second vehicle information,
wherein the control means displays each of the first and second display images in a first display form in which the first and second display images are adjacent to each other, displays each of the first, second, and third display images in a second display form in which the first and second display images are adjacent to each other on both sides of the third display image, and in transition from the first display form to the second display form, displays the third display image between the first and second display images after the first and second display images are moved in a direction in which the first and second display images are separated from each other or while they are moved in that direction,
wherein each of the first and second display images has a decoration image portion which decorates the vehicle information,
wherein, in transition from the first display form to the second display form, the control means switches each of the first and second display images from a decoration display mode in which the decoration image portion is displayed to a simple display mode in which the decoration image portion is not displayed, and
wherein, after the transition from the first display form to the second display form, the control means switches each of the first and second display images from the simple display mode back to the decoration display mode.

2. A display device for vehicle comprising an image display device and control means for displaying vehicle information as an image in the image display device,
wherein the image includes a first display image serving as first vehicle information of the vehicle information, a second display image serving as second vehicle information different from the first vehicle information, and a third display image serving as third vehicle information different from the first and second vehicle information,
wherein the control means displays each of the first and second display images in a first display form in which the first and second display images are adjacent to each other, displays each of the first, second, and third display images in a second display form in which the first and second display images are adjacent to each other on both sides of the third display image, and in transition from the first display form to the second display form, displays the third display image between the first and second display images after the first and second display images are moved in a direction in which the first and second display images are separated from each other or while they are moved in that direction,
wherein each of the first and second display images has a background image portion which serves as a background of the vehicle information and a decoration image portion which decorates the vehicle information,
wherein, in transition from the first display form to the second display form, the control means changes a display state of the decoration image portion such that the display state before the transition is different from the display state after the transition, and
wherein the display state of the decoration image portion is changed by changing a color tone or a decoration feel of the decoration image portion.

3. A display device for vehicle comprising an image display device and control means for displaying vehicle information as an image in the image display device,
wherein the image includes a first display image serving as first vehicle information of the vehicle information, a second display image serving as second vehicle information different from the first vehicle information, and a third display image serving as third vehicle information different from the first and second vehicle information,
wherein the control means displays each of the first and second display images in a first display form in which the first and second display images are adjacent to each other, displays each of the first, second, and third display images in a second display form in which the first and second display images are adjacent to each other on both sides of the third display image, and in transition from the first display form to the second display form, displays the third display image between the first and second display images after the first and second display images are moved in a direction in which the first and second display images are separated from each other or while they are moved in that direction,
wherein each of the first and second display images has a background image portion which serves as a background of the vehicle information and a decoration image portion which decorates the vehicle information,
wherein, in transition from the first display form to the second display form, the control means changes a display state of the decoration image portion such that the display state before the transition is different from the display state after the transition, and wherein the display state of the decoration image portion is changed by enlarging or rotating the decoration image portion.

* * * * *